US012587114B2

(12) United States Patent
Widmer

(10) Patent No.: US 12,587,114 B2
(45) Date of Patent: Mar. 24, 2026

(54) ELECTRICAL SUB-ASSEMBLY AND ASSOCIATED METHOD OF OPERATION

(71) Applicant: ADVANCED ELECTRIC MACHINES GROUP LTD, Washington (GB)

(72) Inventor: James Widmer, Tyne and Wear (GB)

(73) Assignee: ADVANCED ELECTRIC MACHINES GROUP LTD, Washington (GB)

( * ) Notice: Subject to any disclaimer, the term of this patent is extended or adjusted under 35 U.S.C. 154(b) by 0 days.

(21) Appl. No.: 17/265,737

(22) PCT Filed: Aug. 5, 2019

(86) PCT No.: PCT/GB2019/052190
§ 371 (c)(1),
(2) Date: Feb. 3, 2021

(87) PCT Pub. No.: WO2020/025980
PCT Pub. Date: Feb. 6, 2020

(65) Prior Publication Data
US 2021/0175823 A1     Jun. 10, 2021

(30) Foreign Application Priority Data
Aug. 3, 2018    (GB) ...................................... 1812682

(51) Int. Cl.
*H02P 5/50*          (2016.01)
*B60K 1/02*          (2006.01)
*B60L 15/20*         (2006.01)
(52) U.S. Cl.
CPC ................. *H02P 5/50* (2013.01); *B60K 1/02* (2013.01); *B60L 15/20* (2013.01)

(58) Field of Classification Search
CPC .. H02P 5/50; B60K 1/02; B60L 15/20; H02K 16/00; H02K 19/103; H02K 1/24; H02K 1/246; Y02T 10/72
(Continued)

(56) References Cited

U.S. PATENT DOCUMENTS 8,006,789 B2 *   8/2011  Dial ........................ B60L 15/20
                                                      310/216.025
2003/0164655 A1   9/2003  Biais et al.
(Continued)

FOREIGN PATENT DOCUMENTS

CN        102035319 A      4/2011
EP        2503683          9/2012
(Continued)

OTHER PUBLICATIONS

CN 108258862 A (Machine Translation) Switch Reluctance Motor With Low Ripple Torque (Date Filed: Jan. 11, 2018) Feng, Hao Wang, Ning-li Zhao, Hao (Year: 2018).*
(Continued)

*Primary Examiner* — Jorge L Carrasquillo
(74) *Attorney, Agent, or Firm* — Husch Blackwell LLP

(57) ABSTRACT

Electrical sub-assembly and associated method of operation There is provided an electrical sub-assembly having first and second motors, the second motor being a reluctance motor. Each of the first and second motors has a respective rotor drivingly connected to the other and is independently operable to generate torque either alone or in combination with one another. The torque generated by each of the first and second motors may be transmittable to a drivetrain of a vehicle. As such, the electrical sub-assembly may have particular application in a hybrid or electric vehicle.

20 Claims, 3 Drawing Sheets

(58) Field of Classification Search
USPC ........................................................ 318/77
See application file for complete search history.

(56) References Cited

U.S. PATENT DOCUMENTS

| | | | |
|---|---|---|---|
| 2006/0192518 A1* | 8/2006 | Adra ........................ | B60L 15/20 318/701 |
| 2007/0278984 A1 | 12/2007 | Adra et al. | |
| 2010/0231062 A1* | 9/2010 | Sykes ...................... | H02K 3/47 310/46 |
| 2011/0048821 A1* | 3/2011 | Dial ........................ | B60L 15/20 310/46 |
| 2012/0139368 A1* | 6/2012 | Murray, III ............ | H02K 1/246 310/48 |
| 2014/0051544 A1* | 2/2014 | Steffen ................... | H02K 21/12 477/3 |
| 2016/0036366 A1* | 2/2016 | Yang ...................... | H02P 25/098 310/46 |
| 2018/0076743 A1* | 3/2018 | Chik ....................... | H02P 5/747 |

FOREIGN PATENT DOCUMENTS

| | | | |
|---|---|---|---|
| EP | 2503683 | A1 | 9/2012 |
| JP | H09-247910 | A | 9/1997 |
| JP | 10-148251 | A | 6/1998 |
| JP | 2001-314499 | A | 11/2001 |
| JP | 2017-225203 | A | 12/2017 |
| JP | 2018-117481 | A | 7/2018 |
| WO | 2014/021912 | A1 | 2/2014 |
| WO | 2014/091609 | A1 | 6/2014 |
| WO | 2015/104956 | A1 | 7/2015 |

OTHER PUBLICATIONS

Feng et al. (CN 108258862 A) "Switch Reluctance Motor With Low Pulsating Torque" Date Published Jul. 6, 2018 (Year: 2018).*

Tanaka et al. (JP 2017225203 A) Switched Reluctance Motor Drive System Date Published Dec. 21, 2017 (Year: 2017).*

Examination Report dated Jun. 29, 2022 which issued in connection with a corresponding GB application.

Examination Report dated Oct. 10, 2022 which issued in connection with a corresponding Indian application.

Office Action from the Chinese Patent Office dated Feb. 20, 2025.

Office Action from the Japan Patent Office dated May 30, 2024.

* cited by examiner

ELECTRICAL SUB-ASSEMBLY AND ASSOCIATED METHOD OF OPERATION

TECHNICAL FIELD

The invention relates to an electrical sub-assembly, particularly to an electrical sub-assembly for use as an electric traction drive for a hybrid vehicle or an electric vehicle.

Aspects of the invention relate to an electrical sub-assembly, a vehicle, a method and a controller.

BACKGROUND

Hybrid and electric vehicles typically utilise motors comprising permanent magnets generally incorporating rare earth elements such as neodymium (Nd). Other motor types are often not used for differing technical reasons, including lower torque density and problems with noise, vibration and harshness. However, motors comprising rare earth permanent magnets have drawbacks of their own. In particular, rare earth magnets are very expensive, at least relative to the cost of the other components of an electric motor (rare earth magnets may double or more the cost of a motor). Rare earth magnets also have poor sustainability credentials, due to methods used in their mining and refinement.

Moreover, permanent magnet motors will generate magnetic flux whenever a rotor within such a motor is rotating, regardless of whether or not electrical current is applied to the motor. This has potential system reliability and safety implications as magnetically induced voltages may be generated at electrical terminals of the motor or high currents may be generated through motor windings. In addition, such motors will produce iron losses at no load, which are induced by the rotating magnetic field of the rotor, and may produce a fluctuating, non-zero average torque as the motor rotates, a phenomenon often referred to as "cogging". Techniques employed to address cogging tend to reduce motor efficiencies. It is also often necessary to apply so-called "field weakening" in order to allow high rotor speeds to be achieved. Otherwise, voltage induced across motor windings by rotation of the rotor may exceed the supply voltage driving the motor, thus preventing higher operating speeds. However, field weakening causes increased resistive losses, resulting in lower efficiencies. Rare earth magnets may also be prone to demagnetisation if overheated and are difficult to cool if located in a rotor. As such, control strategies must often be implemented to prevent overheating.

Alternatives to permanent magnet motors include induction motors and wound rotor motors. However, these motors may incur losses in their rotors higher than losses in permanent magnetic motors. These relatively higher losses are due to the motors having more windings, i.e. in both the rotor and the stator.

It is desirable to develop new electric motor technologies that do not require the use of permanent magnets, in particular rare earth magnets, and/or that improve efficiencies over those of known alternatives. It is as object embodiments of the invention to at least mitigate one or more problems associated with known arrangements.

SUMMARY OF THE INVENTION

According to an aspect of the invention, there is provided an electrical sub-assembly comprising: a first motor; and a second motor, the second motor being a reluctance motor, wherein each of the first and second motors has a respective rotor drivingly connected to the other and each of the first and second motors is operable to generate torque, i.e. a common supply/source of torque. As such, the first and second motors may be independently operable to generate torque, e.g. that is transmittable to a drivetrain, either by the first motor alone or by the first and second motors in combination with one another.

In certain embodiments, the first motor may be a reluctance motor, i.e. the electrical sub-assembly may comprise a first reluctance motor; and a second reluctance motor and each of the of the first and second motors may be operable to generate torque either alone or in combination with one another.

The electrical sub-assembly may form part of an electric drive including, but not limited to, a traction drive for a hybrid or electric vehicle. The electrical sub-assembly may reduce electric drive costs and/or improve efficiencies, thus increasing the attractiveness and/or viability of electrically driven solutions including, but not limited to, hybrid and electric vehicles as a means of transport.

In certain embodiments, each of the respective rotors may be rotatable about a common axis, such arrangements allowing for simple, compact motor configurations. The respective rotors may be drivingly connected to one other by a drive shaft for transmitting the supply of torque generated by the first and second motors extending therebetween. Optionally, the drive shaft may comprise a monolithic link extending between the respective rotors, allowing for simple, compact and/or robust motor configurations.

At least one of the respective rotors may be connected to the drive shaft such that angular correspondence between the at least one of the respective rotors and the drive shaft is maintained. Additionally, or alternatively, the mechanical angle of one of the respective rotors may be offset from the mechanical angle of the other of the respective rotors. This may facilitate a reduction in torque ripple and acoustic noise due to torque ripple. At least one of the first and second motors may be one of a switched reluctance motor and a synchronous reluctance motor. The first and second motors may be substantially the same as one another, i.e. built to the same specification.

Suitably, the sub-assembly may comprise a controller configured to control operation of at least one of the first and second motors. The controller may be configured to receive an input indicative of speed and/or torque of at least one of the first and second motors. Further, the controller may be configured to control operation of at least one of the first and second motors in dependence on the input. The controller may be further configured to control operation in dependence on the input by use of a function relating the input to efficiencies of at least one of the first and second motors.

According to another aspect of the invention, there is provided a hybrid vehicle or an electric vehicle comprising an electrical sub-assembly as described above.

According to another aspect of the invention, there is provided a method of operating an electrical sub-assembly comprising: operating either one or both of a first motor and a second motor, the second motor being a reluctance motor and each of the first and second motors having a respective rotor drivingly connected to the other, to generate torque either by the first motor alone or by the first and second motors in combination with one another. The first motor may be a reluctance motor. As such, torque may be generated by the first and second motors either alone or in combination with one another.

The method may comprise selectively operating both of the first and second motors to generate torque substantially equally therebetween. Additionally, or alternatively, the method may comprise selectively operating both of the first and second motors to generate torque substantially unequally therebetween.

In certain embodiments, the method may comprise selectively operating one of the first and second motors, e.g. the first motor only, to generate torque at increased efficiency compared to operating both of the first and second motors. Additionally, or alternatively, the method may comprise selectively operating both of the first and second motors to generate torque at increased efficiency compared to operating one of the first and second motors.

Optionally, the method may comprise: receiving an input indicative of speed and/or torque of at least one of the first and second motors; and selectively operating either one or both of the first and second motors in dependence on the input. Selectively operating in dependence on the input may comprise using a function relating the input to efficiencies of at least one of the first and second motors.

According to another aspect of the invention, there is provided a controller for an electrical sub-assembly, the controller configured to: operate at least one of a first motor and a second motor to generate torque either alone or in combination with one another; receive an input indicative of speed and/or torque of at least one of the first and second motors; and control operation of at least one of first and second motors in dependence on the input by use of a function relating the input to efficiencies of at least one of the first and second motors. Either or both of the first and second motors may be a reluctance motor.

It should be understood that features of one of the above-described aspects may be combined with features of one or more of the other above-described aspects.

BRIEF DESCRIPTION OF THE DRAWINGS

Embodiments of the invention will now be described, by way of example only, with reference to the accompanying figures, in which.

DETAILED DESCRIPTION

Figure 1:
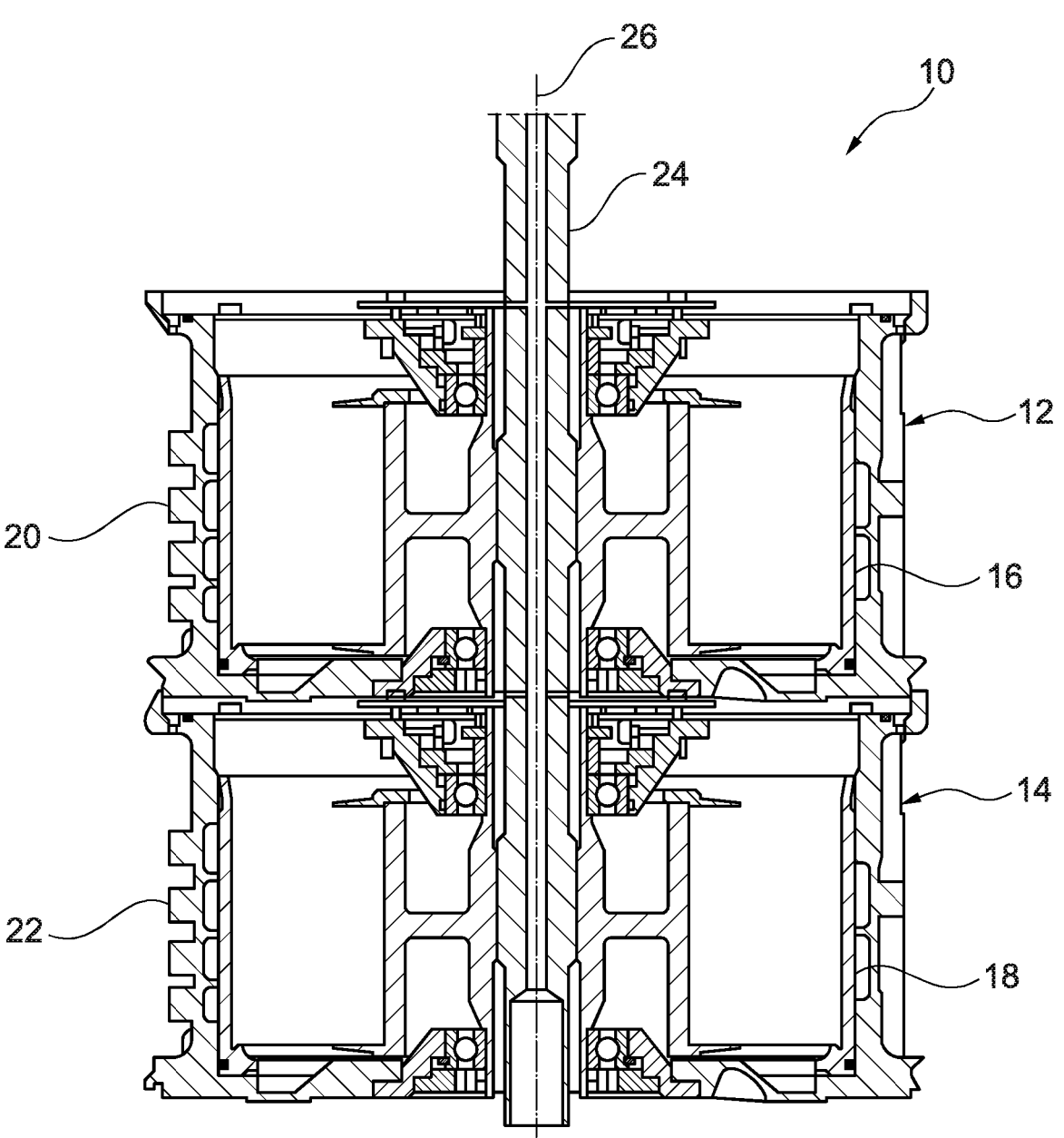
FIG. 1 is a cross-sectional view of an electrical sub-assembly according to an embodiment of the invention.
Figure 5:
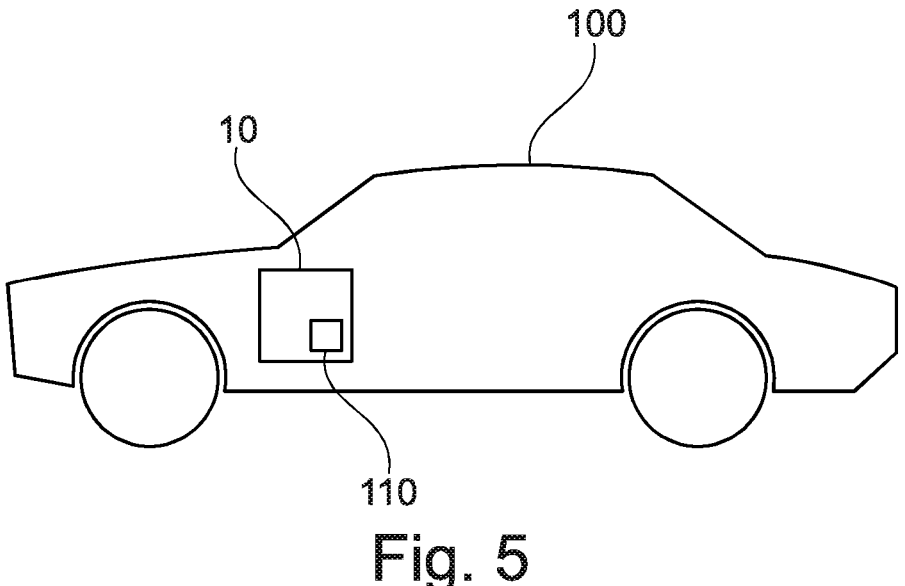
FIG. 5 is a schematic view of a hybrid or electric vehicle according to an embodiment of the invention.

FIG. 1 shows an electrical sub-assembly 10 according to an embodiment of the invention. The sub-assembly 10 has particular application for use as an electric traction drive for a hybrid or electric vehicle 100 (see FIG. 5). As such, the sub-assembly 10 may be part of a powertrain, i.e. the powertrain may comprise the electrical sub-assembly 10 and a drivetrain. As the skilled reader will understand, the drivetrain may comprise one or more features that deliver mechanical power from the sub-assembly 10 to a final drive, e.g. one or more drive wheels. The drivetrain may comprise one or more of a gearbox, a clutch, an axle, a transmission and a torque converter. Other applications are contemplated.

The sub-assembly 10 comprises a first reluctance motor 12 and second reluctance motor 14. As the skilled reader will understand, a reluctance motor is an electric motor that induces non-permanent magnetic poles on a ferromagnetic rotor. The rotor does not require rotor windings and torque is generated by the motor by the phenomenon of magnetic reluctance. Each of the first and second motors 12, 14 comprise a respective rotor 16, 18 and a respective stator 20, 22. The respective rotors 16, 18 are configured to be driving connected to one another. Used herein, drivingly connected is to be understood to mean connected in manner so as to permit the transmission of torque between one or more connected features. As such, rotation of one of the first and second rotors 16, 18 may cause rotation of the other. Each of the respective stators 20, 22 may have wound field coils for stator windings.

In certain embodiments, at least one of the first and second motors 12, 14 may be a synchronous reluctance motor (often abbreviated as SynRM). In certain embodiments, at least one of the first and second motors 12, 14 may be a switched reluctance motor (often abbreviated as SRM and sometimes referred to as a variable reluctance motor). Reluctance motors have a simplified design compared to more commonly used motors, e.g. induction motors, as electrical power does not need to be supplied to the rotor. Consequently, reluctance motors may be simple to build and inexpensive, at least when compared to more commonly used motors. As the skilled reader will understand, each of the motors 12, 14 may be controlled by proprietary three-phase power electronics However, any suitable means of control may be used, e.g. an asymmetric half-bridge converter.

The respective rotors 16, 18 may be drivingly connected to one another by a drive shaft 24. The drive shaft 24 is for transmitting torque generated by either of the first and second motors 12, 14 to other features, i.e. the drive shaft 24 may form part of the drivetrain. The first and second motors 12, 14 may be arranged relative to one another such that the respective rotors 16, 18 are rotatable about a common axis 26 (such an arrangement is shown in FIG. 1). Although, in certain embodiments, the first and second motors 12, 14 may be angularly offset such that the respective rotors 16, 18 are each rotatable about respective axes. To this end, the drive shaft 24 may comprise one or more of a universal joint, a jaw coupling and a rag joint. In certain embodiments, the drive shaft 24 may be, or at least comprise, a monolithic link extending between the respective rotors 16, 18. Used herein, monolithic is to be understood to mean of one-piece construction. Arranging the first and second motors 12, 14 such that respective rotors 16, 18 are rotatable about the common axis 26 and having the monolithic link extending between the respective rotors 16, 18 may be particularly beneficial, as the arrangement is simple to build and robust. In certain embodiments, the respective rotors 16, 18 may be drivingly connected to one another by a drive belt.

In certain embodiments, to allow for variation in alignment and/or distance between each of the first and second motors 12, 14 (and/or between at least one of the first and second motors 12, 14 and one or more other features, e.g. a feature of the drivetrain), the drive shaft 24 may be splined, i.e. the drive shaft may have a plurality of ridges or teeth extending around a circumference thereof for meshing with corresponding grooves of at least one of the respective rotors 16, 18. As such, at least one of the respective rotors 16, 18 may have a splined hub. The ridges or teeth may maintain angular correspondence between at least one of the respective rotors 16, 18 and the drive shaft 24. Additionally, or alternatively, angular correspondence between at least one of the respective rotors 16, 18 and the drive shaft 24 may be maintained by a keyway and key arrangement. In certain embodiments, either or both the respective rotors 16, 18 may be fixedly connected to the drive shaft 24 or formed integrally therewith.

In use, each of the first and second motors 12, 14 may be operated independently of the other, i.e. power may be supplied to either one or both of the first and second motors 12, 14, or more specifically to one or both of the respective stators 20, 22. Thus, torque may be generated by either one or both of the first and second motors 12, 14 alone or in combination with one another. As such, when operated simultaneously, each of the motors 12, 14 will contribute to the total amount of torque generated. As previously mentioned, as the respective rotors 16, 18 are drivingly connected to one another, rotation of one of the respective rotors may cause rotation of the other. Thus, either of the respective rotors 16, 18 may rotate regardless of whether power is supplied the respective stator 20, 22. Advantageously, this no-load rotation (i.e. in at least one of the first and second motors 12, 14) does not generate magnetic flux, as occurs in permanent magnet motors. Thus, when the either of the respective rotors 16, 18 is rotating and the corresponding motor is switched off, there may be no losses and no voltage at the motor terminals. This may provide improvements in efficiencies and/or safety. As the skilled reader will understand, this benefit is derived from the one of the first and second motors 12, 14 that is subject to no-load rotation being a reluctance motor, i.e. the other of the first and second motors 12, 14 may be otherwise provided, e.g. as an induction motor.

Figure 2:
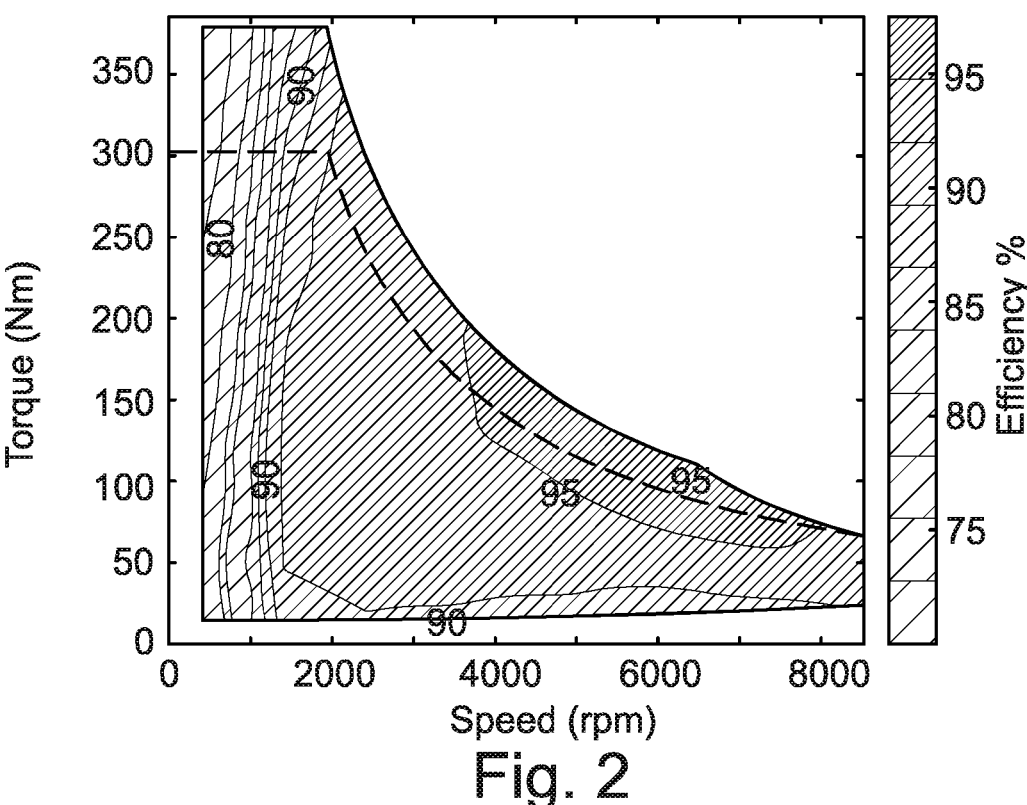
FIG. 2 is a contour plot showing indicative performance of the electrical sub-assembly of FIG. 1 when operating only one of two motors.

FIG. 2 shows efficiency against torque (vertical axis) and speed (horizontal axis) of the sub-assembly 10 when operating only one of the first and second motors 12, 14. Efficiency shown is mechanical power output as a proportion of electrical power input. Peak efficiencies may be exhibited in the areas of the plot corresponding to speeds where vehicles operate frequently, which in the described embodiment corresponds to approximately 3500-7500 rpm. Of course, if the sub-assembly 10 is part of a power train, the speed of one or both of the first and second motors 12, 14 may be proportional to speed of the vehicle 100. However, efficiencies may vary depending on the amount of torque required, e.g. to provide acceleration and/or overcome rolling resistance and air resistance. As shown in FIG. 2, lower efficiencies may be achieved at lower amounts of torque.

Figure 3:
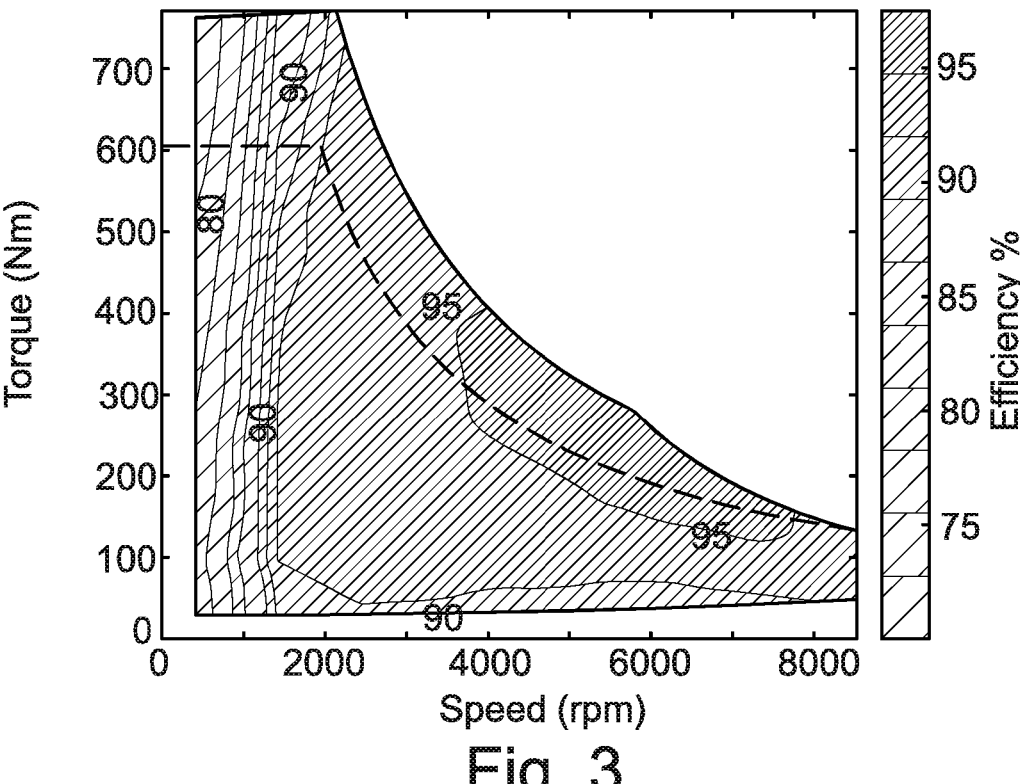
FIG. 3 is a contour plot showing indicative performance of the electrical sub-assembly of FIGS. 1 and 2 when operating both of the two motors.
Figure 4:
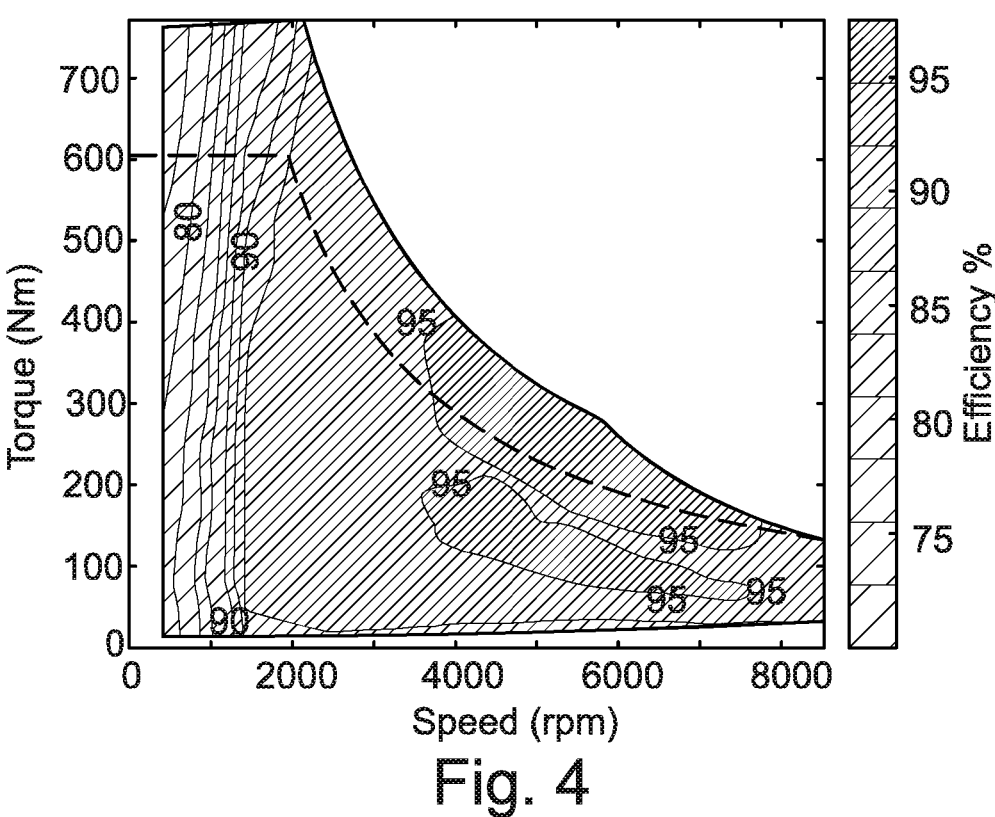
FIG. 4 is a contour plot showing indicative peak performance of the electrical sub-assembly of FIGS. 1 to 3 when operating either one or both of the two motors.

Similarly, FIG. 3 shows efficiency against torque (vertical axis) and speed (horizontal axis) of the sub-assembly 10 when operating both of the first and second motors 12, 14 (note the different scale of the vertical axis). Peak efficiencies may be exhibited at similar speeds to those when operating only one of the first and second motors 12, 14. Although, as shown in FIG. 3, lower efficiencies may also be achieved at lower amounts of torque. Thus, by selectively operating each of the first and second motors 12, 14 alone and in combination, relatively higher efficiencies may be achievable over greater ranges of torque and/or speed. This effect is illustrated by FIG. 4, which shows peak efficiency against torque (vertical axis) and speed (horizontal axis) of the sub-assembly 10 when operating either one or both of the first and second motors 12, 14, i.e. the best efficiencies achievable by operating either one or both of the first and second motors 12, 14 for a given torque and/or speed.

The sub-assembly 10 may comprise a controller 110 (see FIG. 5) for controlling operation of either or both of the first and second motors 12, 14. The controller 110 may control operation of either or both of the first and second motors 12, 14 by selecting one or more control parameters. The one or more control parameters may include voltage and current to be supplied to each of the first and second motors 12, 14. Each of the first and second motors 12, 14 may be selectively operated by switching each of the first and second motors 12, 14 on and off, or by variably powering the first and second motors 12, 14, i.e. by providing a supply of variable current or voltage. In certain embodiments, the sub-assembly 10 may not comprise the controller 110, instead the controller 110 may be in operable communication with the sub-assembly 10, e.g. by being provided elsewhere on the vehicle 100.

The controller 110 may be configured to receive an input indicative of a speed of each or both of the first and second motors 12, 14 and/or a torque generated by each or both of the first and second motors 12, 14. As the skilled reader will understand, torque of the sub-assembly 10, or each or of the first and second motors 12, 14, may be determined by a torque sensor, i.e. a torque transducer. Alternatively, torque may be derived from a current supplied to either or both of the first and second motors 12, 14. Current may be determined by a current transducer. Speed may be determined by at least one of an encoder and a resolver.

The controller 110 may be configured to control to each of the first and second motors 12, 14 in dependence on the speed of each or both of first and second motors 12, 14 and/or the torque generated by each or both of the first and second motors 12, 14. The controller 110 may comprise a processor and an electronic memory. The electronic memory may store a function that relates speed and/or torque of the first and second motors 12, 14 to the one or more of the control parameters. The function may be derived from efficiency-torque-speed data such as shown in FIGS. 2 to 4.

Each of the first and second motors 12, 14 may be substantially the same as one another, i.e. each of the first and second motors 12, 14 may be produced to the same specification and, thus, may each exhibit the same operating and performance characteristics. This may be particularly beneficial as it allows for the electrical sub-assembly 10 to be of modular construction. The electrical sub-assembly 10 may comprise a plurality of motors, i.e. two or more of a third motor, a fourth motor, etc., wherein each motor has a respective rotor drivingly connected to the rotors of the other motors. Each of the plurality of motors, or a subset thereof, may be operable to generate torque either alone or in combination with one another. The electrical sub-assembly 10 may comprise two, three or more, motors each produced to the same specification. However, in certain embodiments, the electrical sub-assembly 10 may comprise two, three or more, motors each produced to one of two or more different specifications. By using different numbers of motors and/or motors produced to different specifications, improved efficiencies may be possible for a range of different torques and/or speeds.

Disadvantages sometimes associated with reluctance motors include high torque ripple (i.e. the difference between a maximum and a minimum torque exhibited during one revolution of the rotor), particularly when operated at low speeds, and acoustic noise due to torque ripple. However, these disadvantages may be reduced by offsetting the mechanical angle of one of the respective rotors 16, 18 from the other. As the skilled reader will understand, the mechanical angle is the angle of a rotor relative to a stator. Mechanical degrees in a motor refers to the rotation of a rotor, i.e. one revolution of the rotor equals 360 mechanical degrees. The amount of offset will depend on the design of the respective rotors 16, 18, but may be such that one of the respective rotors 16, 18 is offset by 360 mechanical degrees divided by twice the number of rotor poles of each of the respective rotors 16, 18 from the other, or some other angular displacement as may be advantageous to minimise motor harmonics.

All of the features disclosed in this specification (including any accompanying claims and drawings) and/or all of the steps of any method or process so disclosed, may be combined in any combination, except combinations where at least some of such features and/or steps are mutually exclusive. While it is envisaged that the invention will have particular application in hybrid or electric cars and commercial vehicles, e.g. trucks and vans, other applications are contemplated, including but not limited to hybrid or electric rail locomotives, off-highway and construction vehicles, marine vessels and static applications.

Each feature disclosed in this specification (including any accompanying claims and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims and drawings) or to any novel one, or any novel combination, of the steps of any method or process so disclosed. The claims should not be construed to cover merely the foregoing embodiments, but also any embodiments which fall within the scope of the claims.

The invention claimed is:

1. An electrical sub-assembly comprising:
a first motor; and
   a second motor;
   wherein the first motor and the second motor are independently operable to generate a torque of the electrical sub-assembly;
wherein in a first operating mode, the first motor is configured to generate the torque and the second motor does not contribute to the torque;
   wherein in a second operating mode, the second motor is configured to generate the torque and the first motor does not contribute to the torque;
   wherein in a third operating mode, the first motor and the second motor are configured to cooperatively generate the torque;
   wherein the first motor and the second motor are substantially the same as one another;
   wherein each of the first motor and the second motor is a switched reluctance motor having a respective rotor drivingly connected to the other;
   wherein a mechanical angle of one of the respective rotors is offset from a mechanical angle of the other of the respective rotors;
   wherein the respective rotors are drivingly connected to one another by a drive shaft for transmitting the torque; and wherein a range of speed of the first motor and the second motor that achieves operation at or near a peak efficiency of the electrical subassembly in the third operating mode is substantially the same as a range of speed of the first motor that achieves operation at or near a peak efficiency of the electrical sub-assembly in the first operating mode and substantially the same as a range of speed of the second motor that achieves operation at or near a peak efficiency of the electrical sub-assembly in the second operating mode.

2. An electrical sub-assembly according to claim 1, wherein each of the respective rotors is rotatable about a common axis.

3. An electrical sub-assembly according to claim 1, wherein at least one of the respective rotors is connected to the drive shaft such that angular correspondence between the at least one of the respective rotors and the drive shaft is maintained.

4. An electrical sub-assembly according to claim 1, further comprising a controller configured to control operation of at least one of the first motor and the second motor.

5. An electrical sub-assembly according to claim 4, wherein the controller is configured to receive an input indicative of speed and/or torque of at least one of the first motor and the second motor and to control operation of at least one of the first motor and the second motor in dependence on the input.

6. An electrical sub-assembly according to claim 5, wherein the controller is further configured to control operation in dependence on the input by use of a function relating the input to efficiencies of at least one of the first motor and the second motor.

7. An electric vehicle or hybrid electric vehicle comprising the electrical sub-assembly according to claim 1.

8. An electrical sub-assembly according to claim 1, further comprising a controller configured to control operation of the first motor and the second motor in the first operating mode, the second operating mode, and the third operating mode, wherein the controller is configured to select the first operating mode, the second operating mode, or the third operating mode.

9. An electrical sub-assembly according to claim 8, wherein the controller is configured to:
   execute a function that relates an input indicative of speed and/or torque of at least one of the first motor and the second motor to efficiency of the electrical sub-assembly; and
   select the first operating mode, the second operating mode, or the third operating mode in response to the executed function.

10. An electrical sub-assembly according to claim 1, wherein the first motor and the second motor are configured to operate with substantially the same operating and performance characteristics.

11. An electrical sub-assembly according to claim 10, wherein the first motor and the second motor are configured to operate with substantially the same efficiency profile as a function of torque and speed.

12. An electrical sub-assembly according to claim 11, wherein the electrical sub-assembly is configured to have an efficiency, measured as mechanical power output as a proportion of electrical power input, of at least 95% over a greater range of torque and/or speed in the third operating mode relative to the first operating mode and the second operating mode.

13. An electrical sub-assembly according to claim 1, wherein the drive shaft comprises a monolithic link extending between the respective rotors.

14. A method of operating an electrical sub-assembly comprising:
   operating a first motor and a second motor, each of the first motor and the second motor being a switched reluctance motor having a respective rotor drivingly connected to the other, to generate torque in a first operating mode, wherein the first motor generates the torque and the second motor does not contribute to the torque, a second operating mode, wherein the second motor generates the torque and the first motor does not contribute to the torque, or a third operating mode, wherein the first motor and the second motor cooperatively generate the torque;

selecting the first operating mode, the second operating mode, or the third operating mode;

generating the torque via the selected operating mode;

wherein the first and second motors are substantially the same as one another;

wherein a mechanical angle of one of the respective rotors is offset from a mechanical angle of the other of the respective rotors;

wherein the respective rotors are drivingly connected to one another by a drive shaft for transmitting the torque; and wherein a range of speed of the first motor and the second motor that achieves operation at or near a peak efficiency of the electrical subassembly in the third operating mode is substantially the same as a range of speed of the first motor that achieves operation at or near a peak efficiency of the electrical sub-assembly in the first operating mode and substantially the same as a range of speed of the second motor that achieves operation at or near a peak efficiency of the electrical sub-assembly in the second operating mode.

15. A method according to claim 14, further comprising selectively operating both of the first motor and the second motor to generate torque substantially equally therebetween.

16. A method according to claim 14, further comprising selectively operating both of the first motor and the second motor to generate torque substantially unequally therebetween.

17. A method according to claim 14, further comprising selectively operating one of the first motor and the second motor to generate torque at increased efficiency compared to operating both of the first motor and the second motor.

18. A method according to claim 14, further comprising selectively operating both of the first motor and the second motor to generate torque at increased efficiency compared to operating one of the first motor and the second motor.

19. A method according to claim 14, further comprising:

receiving an input indicative of speed and/or torque of at least one of the first motor and the second motor; and selectively operating either one or both of the first motor and the second motor in dependence on the input.

20. A method according to claim 19, wherein selectively operating in dependence on the input comprises using a function relating the input to efficiencies of at least one of the first motor and the second motor.

* * * * *